UNITED STATES PATENT OFFICE 2,524,799

HYDROXYBENZENESULFONAMIDOIMIDAZOLES AND PREPARATION OF THE SAME

Martin E. Hultquist, Bound Brook, N. J., and Yellapragada SubbaRow, deceased, late of Pearl River, N. Y., by Aloysius J. Bryant, administrator, South Nyack, N. Y., assignors to American Cyanamid Company, New York, N. Y., a corporation of Maine No Drawing. Application January 7, 1949, Serial No. 69,822

9 Claims. (Cl. 260—309)

This invention relates to new and useful sulfonamides and to methods of preparing the same.

It has been discovered that certain p-hydroxybenzenesulfonamido imidazoles and pyrazoles possess unexpected anti-viral activity, particularly in the neurotropic virus diseases and may, therefore, become important drugs in the treatment of these and related diseases. The new compounds of the present invention may be represented by the general formula:

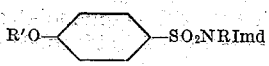

in which R represents hydrogen or an aliphatic, aralkyl or heterocyclic radical, Imd represents an imidazole or pyrazole radical attached to the amide nitrogen by a carbon in the heterocyclic ring and R' represents hydrogen or an acyl group. The imidazole or pyrazole radical may bear one or more substituent radicals at the remaining positions such as alkyl, aryl, aralkyl, and the like, or it may form a part of a condensed heterocyclic system.

The hydrogen atom of the phenolic —OH radical as well as that attached to the amide nitrogen where R equals hydrogen are acidic in nature and may be replaced by simple neutralization or otherwise with a cationic radical of a metal or organic base. Such salts are of particular value especially in that the solubility of the compound is affected thereby, usually increased. Obviously such salts are included within the scope of the present invention.

The new p-hydroxybenzenesulfonamido-imidazoles and -pyrazoles may be prepared by several distinct methods, the more important of which will be described in the specific examples which follow. The preferred method is by the hydrolysis of a suitable ester of a p-hydroxybenzenesulfonamido-imidazole or -pyrazole under either acidic or alkaline conditions whereby the —OH group is formed in the reaction. These esters which have the general formula

R' being an acyl radical, are believed to be new and are intended to be included within the scope of the invention. These esters are valuable per se as drugs since they may be hydrolyzed in the system.

To prepare the new acyl compounds of the present invention several methods are available. A preferred method involves the condensation of an appropriate benzene sulfonyl halide with an aminopyrazole or an amidoimidazole in accordance with the following equation:

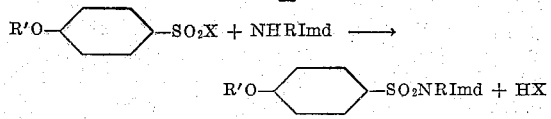

In the above R' is an acyl radical such as benzoyl, acetyl, furoyl, tosyl, carbethoxy or the like which may later be removed by hydrolysis. X is a halogen, preferably chlorine, but if desired fluorine or bromine. Imd is an imidazole or pyrazole radical such as mentioned above in which the amino group is attached to a carbon atom in the heterocyclic ring.

To prepare intermediates in which R is an organic radical of the kind mentioned above, secondary amines such as 2-N-(beta-hydroxyethyl)-amino-, 2-(N-methylamino)-imidazole or -pyrazole and the like are employed in the reaction.

The preferred method of effecting the condensation is to bring together the reactants shown in the above equation at 0° to 100° C. until condensation is completed. It is preferred that the condensation be conducted with the reactants dissolved or suspended in a tertiary nitrogen base such as pyridine or in an organic solvent containing a basic compound such as sodium carbonate or trimethylamine as acid acceptor or in an aqueous solution containing a substance which will react with the hydrohalide acid formed during the reaction and prevent it from interfering with the reaction.

Hydrolysis of the resulting compounds to convert the group R'O to HO— can be effected over a wide range of conditions. The temperature for the hydrolysis may range from about 0° to 150° C. with the preferred temperatures being between 50° and 100° C., but this may vary with the nature of the compound being hydrolyzed. Sodium hydroxide at a concentration of approximately 10% and in slight molecular excess, usually about 1 mol, is preferred. Other alkaline hydrolyzing agents including potassium hydroxide, barium hydroxide, calcium hydroxide, trimethylbenzylammonium hydroxide or other quaternary hydroxides, ammonia and the like may also be used. Conversion of the group R'O— to HO— can also be effected by hydrolysis under acidic conditions using hydrochloric acid, sulfuric acid or other known acid hydrolyzing agents.

The time for completion of the hydrolysis depends on several factors including temperature, concentration of the hydrolyzing agent, nature of the compounds, etc. Using, for example, sodium hydroxide at 10% concentration and at a temperature of 75° to 95° C., the hydrolysis is completed in about one hour.

Although hydrolysis is usually conducted under essentially aqueous conditions, the water may be replaced in part or largely with water miscible solvents such as alcohol. The presence of an inert water immiscible organic solvent in the reaction mixture is not precluded and, in fact, may offer advantages in some cases.

A distinct method of preparing the compounds of the present invention involves the use as starting material one of the known p-aminobenzenesulfonylamido-imidazoles or -pyrazoles. This process involves diazotization of the p-amino-group on the benzene ring followed by decomposition of the diazo compound under carefully controlled conditions so that a hydroxy group is formed. In general, the diazotization is carried out in the customary manner at 0° to 25° C. in 5% to 20% sulfuric acid using a slight excess of the theoretical amount of sodium nitrite. When the diazotization is complete the solution is heated to 50° to 80° C. to cause decomposition to take place. A flash decomposition carried out by passing the solution through a hot tube or through a steam gun is quite successful. A large excess of sulfuric acid may be used in the process, varying from 2 mols upwards. Decomposition is usually complete in 15 to 20 minutes at 80° C. Other acids such as hydrochloric, acetic, phosphoric and the like may, of course, be used to replace the sulfuric, if desired.

The invention will now be illustrated by the preparation of a representative p-hydroxybenzenesulfonamidoimidazole in the following examples. All parts are by weight unless otherwise indicated.

*Example*

39.9 parts of 2-aminobenzimidazole is slurried in 49 parts of pyridine and 103.8 parts of tosyloxybenzenesulfonyl chloride is added gradually with stirring, at such a rate that the temperature does not rise over 30° C. The mixture is allowed to stand for 12 hours. 150 parts of water is then added, with stirring, and the mixture is heated to the boil for 40 minutes. The product is cooled and filtered and the granular product is washed and dried at 110° C. 144.9 parts of crude product N-(2-benzimidazolyl)-1 tosyloxybenzene-4-sulfonamide is obtained. 274 parts of ten percent sodium hydroxide solution is added to the crude product and the slurry obtained is heated to the boil for 1 hour. The clear solution obtained is treated with 14.4 grams of activated carbon, filtered, and the filtrate is acidified with hydrochloric acid to pH 3. The precipitate obtained is collected on the filter, washed and dried at 110° C. It is recrystallized twice from a minimum of anhydrous ethyl alcohol and the N-(2-benzimidazolyl)-1-phenol-4-sulfonamide which is obtained is dried at 110° C. It is a white crystalline material, M. P. 333.0–335.0° C.

In accordance with the above disclosed method, the following additional p-hydroxybenzenesulfonamide heterocycles may be prepared N-(2-imidazolyl)-1-phenol-4-sulfonamide
N-(3-pyrazolyl)-1-phenol-4-sulfonamide
N-(4-pyrazolyl)-1-phenol-4-sulfonamide
N-(1-methyl-2-imidazolyl)-1-phenol-4-sulfonamide
N-(3,5-dimethyl-4-pyrazolyl)-1-phenol-4-sulfonamide
N-(3-imidazolyl)-1-phenol-4-sulfonamide
N-(1-methyl-2-imidazolyl)-1-phenol-4-sulfonamide
N-(3-methyl-5-pyrazalon-4-yl)-1-phenol-4-sulfonamide using as intermediates the appropriate heterocyclic amines.

Certain other p-hydroxysulfonamides and related compounds are set forth in applicants' copending application Serial Number 25,524, filed May 6, 1948.

The above compounds and others may also be prepared by diazotizing and subsequently decomposing the diazo group of analogous sulfanilamido-imidazoles and -pyrazoles.

What we claim is:

1. Compounds of the general formula

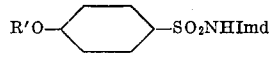

where R' is chosen from the group consisting of hydrogen and acyl radicals and Imd is an imidazolyl radical, and salts of said compounds.

2. Compounds of general formula

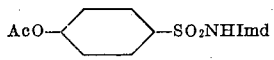

where Ac is an acyl group and Imd is an imidazolyl radical, and salts of said compounds.

3. N-(2-benzimidazolyl)-1 tosyloxybenzene-4-sulfonamide.

4. N-(2-imidazolyl)-1-phenol-4-sulfonamide.

5. N-(1-methyl-2-imidazolyl)-1-phenol-4-sulfonamide.

6. Compounds of the general formula

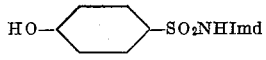

where Imd is an imidazolyl radical, and salts of said compounds.

7. N-(2-benzimidazolyl)-1-phenol-4-sulfonamide.

8. The method of preparing compounds having the formula

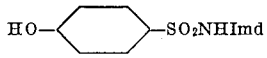

where Imd is an imidazolyl radical, which comprises hydrolyzing compounds of the formula

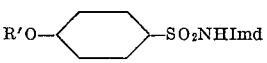

where R' is an acyl compound, at a temperature in the range 0–150° C. until the acyl group is removed and recovering the product.

9. The method of preparing N-(2-benzimidazolyl)-1-phenol-4-sulfonamide which comprises hydrolyzing at a temperature in the range 0–150° C. N-(2-benzimidazolyl)-1-tosyloxybenzene-4-sulfonamide in the presence of aqueous alkali until the acyl group is removed and recovering said product.

MARTIN E. HULTQUIST.
ALOYSIUS J. BRYANT,
*Administrator of the Estate of Yellapragada SubbaRow, Deceased.*

REFERENCES CITED

The following references are of record in the file of this patent:

Billton: Biologie Medicale, vol. 27, Supplement 1937, p. 84.

Kermack: Jr. Chem. Society (London), 1939, pp. 608–609.

Northey: "The Sulphonamides and Allied Compounds," 1948, pp. 31, 75 and 76.